Sept. 11, 1951  F. M. HOGUE  2,567,603
PRESSURE FLUID OPERATED SERVOMOTOR
Original Filed Sept. 28, 1946  3 Sheets-Sheet 2

*INVENTOR.*
FRANCIS MARION HOGUE
BY
ATTY.

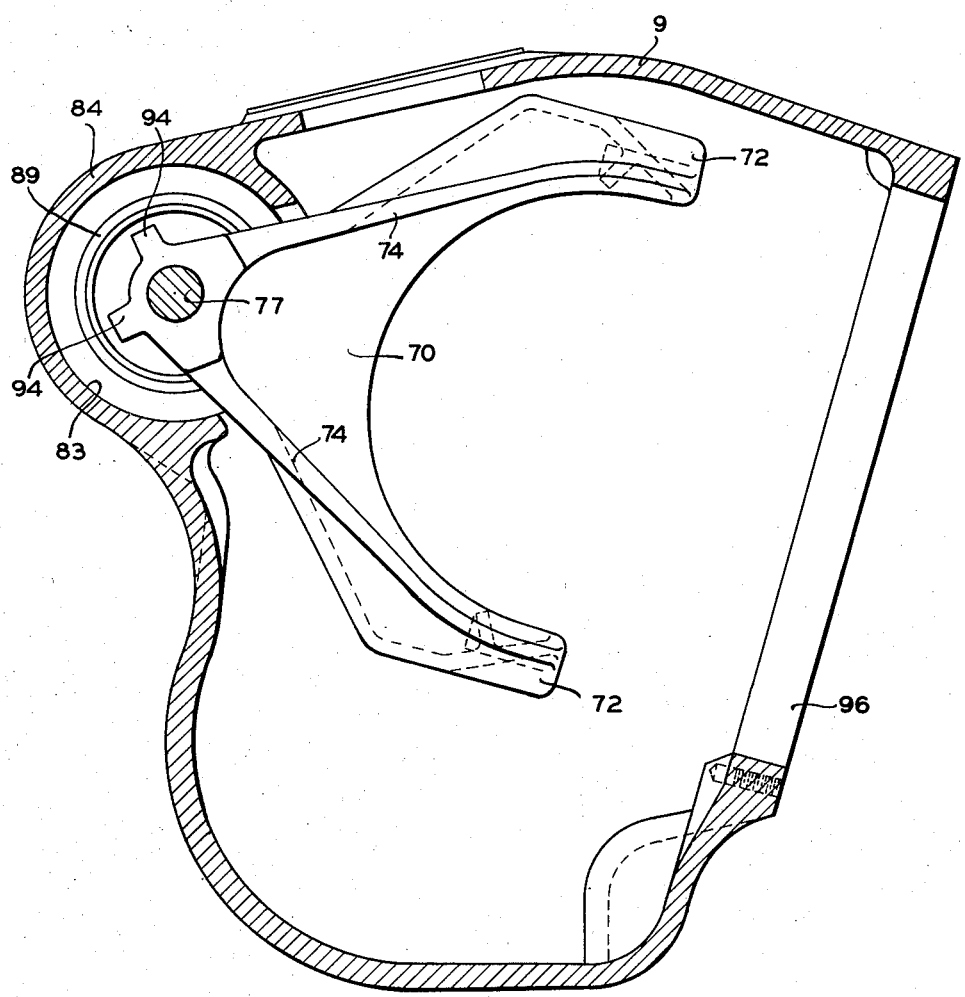

Patented Sept. 11, 1951

2,567,603

UNITED STATES PATENT OFFICE 2,567,603

PRESSURE FLUID OPERATED SERVOMOTOR

Francis Marion Hogue, Berrien Springs, Mich., assignor to Clark Equipment Company, Buchanan, Mich., a corporation of Michigan Original application September 28, 1946, Serial No. 700,068, now Patent No. 2,529,393, dated November 7, 1950. Divided and this application September 14, 1949, Serial No. 115,746

7 Claims. (Cl. 121—38)

1

This invention is concerned primarily with the provision of an auxiliary transmission for attachment to a standard automotive type transmission and control means for such auxiliary transmission.

The present application is a division of my copending application, Serial #700,068, filed September 28, 1946, now Patent No. 2,529,393, granted November 27, 1950, and is directed more particularly to the fluid motor mechanism for controlling the auxiliary transmission.

Broadly stated, the present invention is directed to a two-speed auxiliary transmission which is so designed that it can be attached directly to the rear end wall of a standard type transmission without requiring changing of any of the parts of the standard transmission, and which provides an output shaft in line with the normal output shaft of the standard transmission and equipped to receive the same companion flange for connection to a universal joint and propeller shaft.

One of the objects of the present invention is to provide, in conjunction with the transmission of a heavy duty type such as might be used on buses, trucks, and similar vehicles, an auxiliary transmission which provides two additional speed ratios and which can be attached to the conventional transmission without requiring any substantial modification or change therein or in the drive train of the vehicle.

Another object of the present invention is to provide a construction of this type having novel type of control means for selectively controlling the shift by which one or the other of the speed ratios in the auxiliary transmission can be selected.

Another object of the present invention is to provide a compact shift arrangement which can be controlled either pneumatically or hydraulically, and which provides for return of the shifting mechanism to neutral position automatically when the pressure is released in the shift control mechanism.

A still further advantage secured by the present invention is to enclose the shift control mechanism within the housing of the auxiliary transmission without substantially enlarging such housing and without increasing the axial length of the transmission so that the transmission is kept relatively short in length to provide for a propeller shaft of sufficient length.

Other objects and advantages of the present construction will appear more fully from the following detailed description which, taken in conjunction with the accompanying drawings, will disclose to those skilled in the art, the particular construction and operation of a preferred form of the present invention.

In the drawings:

Figure 4 is a sectional transverse view through the auxiliary transmission housing showing the relative position of the shift control mechanism with respect to the shifter fork.

Figure 1:
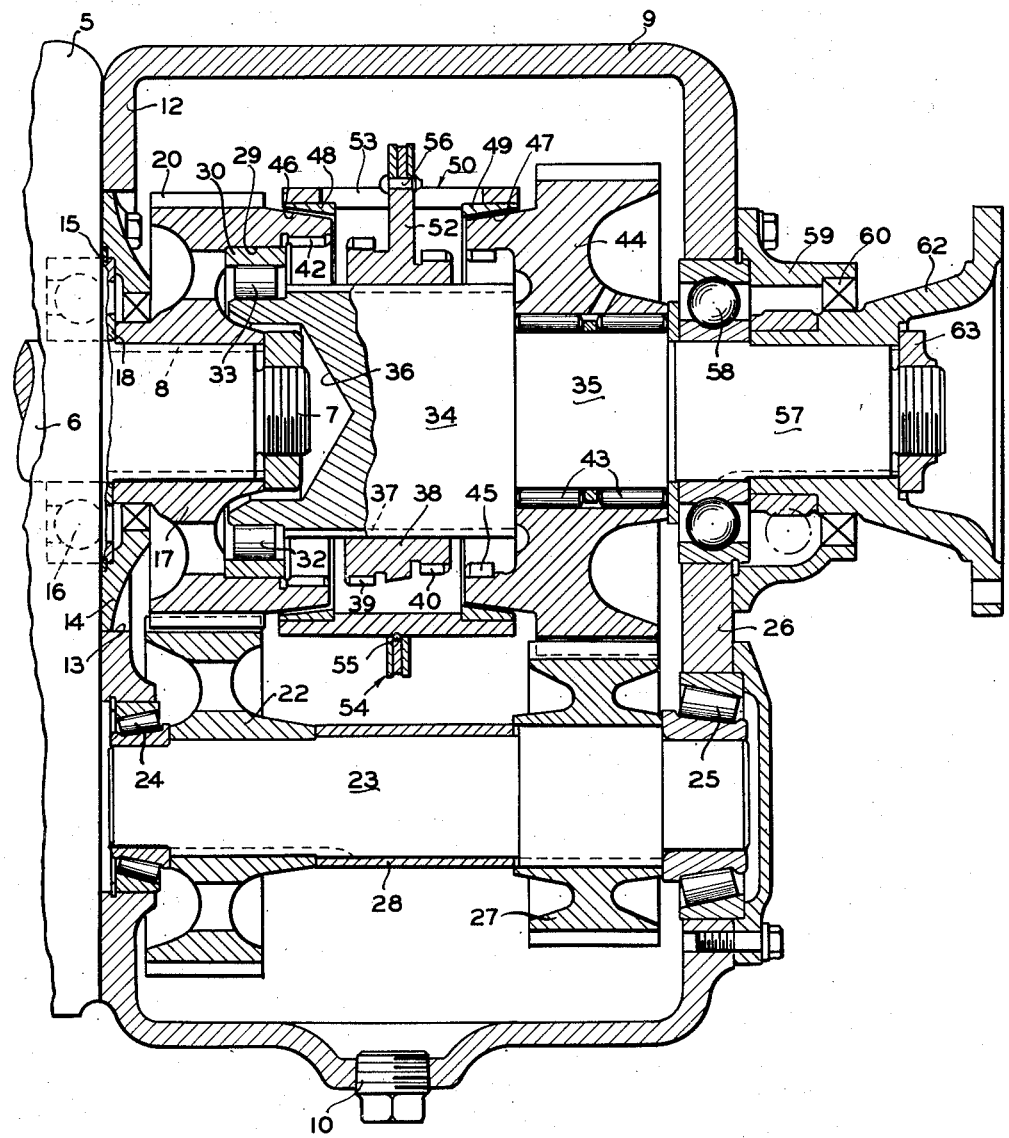
Figure 1 is a sectional view through the auxiliary transmission of the present invention.

Referring now in detail to the drawings, there is provided a standard or conventional type transmission housing 5 having an output shaft 6 which, as is usual practice, projects beyond the end wall of the standard transmission and is provided with splined portions 8 on its projecting end and with a reduced threaded stud portion 7.

Secured to the conventional transmission housing 5 and supported thereon as a rigid unit, is the auxiliary transmission housing 9, which is of generally box formation and is provided in its lower or bottom wall with the drain plug 10. The housing 9 is provided with a forward end wall 12 which is secured in any suitable manner to the end wall of the conventional transmission housing 5, and preferably there is provided an opening 13 therein within which is disposed a bearing cap 14, which cap contains the lock ring 15 for securing the outer race of the ball bearing assembly 16 that supports the output shaft 6 of the main transmission.

Mounted on the splined portion 8 of this output shaft is a gear member 17 which, at one end, bears against the thrust washer 18, locking the inner race of the bearing assembly 16 in position. The opposite end of the hub portion of gear 17 is held in position by the nut 19 threaded on the projecting stud 7 of the shaft 6.

The gear 17 is provided with external gear teeth 20 which are in constant meshing engagement with the teeth of a gear 22 splined upon the lay or countershaft 23 of the auxiliary transmission. The shaft 23 is journalled at its forward end in tapered bearings 24 secured in the end wall 12 of the housing 9, and at its opposite end is supported in tapered bearings 25 supported in the rear end wall 26 of the housing 9.

A second gear 27 is non-rotatably secured upon the shaft 23 and is held in spaced relation to the gear 22 by means of the sleeve or spacer member 28.

The gear 20 on the output shaft 6 is provided with an internal annular shoulder portion 29 which receives the outer race 30 of a roller bearing assembly, including the rolls 32 which are supported on the extended annular surface 33 of an enlarged portion 34 of the auxiliary transmission output shaft 35. The shaft portion 34 is recessed, as at 36, to receive the projecting hub portion of the gear 17 and end 7 of the shaft 6, and also is preferably provided with external splines 37 for receiving an axially slidable clutch member, generally indicated at 38, having axially spaced clutch gear portions 39 and 40. The gear 17 is provided with internal clutch portions 42 overhanging the portion 34 of the shaft 35 and adapted to receive the clutch teeth 39 of clutch member 38 when it is shifted to the left from the position shown in Figure 1.

Rotatably mounted upon the shaft 35, as by means of the needle rollers 43, is a gear member 44, having external gear teeth in constant meshing engagement with the gear teeth of gear 27 on countershaft 23. Gear 44 is also provided with internal clutch teeth 45 which are adapted to be engaged by the clutch teeth 40 of clutch member 38 when it is shifted to the right from the position shown in Figure 1. Each of the gears 17 and 44 is also provided with a tapered synchronizing surface 46 and 47, respectively, adapted to receive corresponding tapered frictional elements 48 and 49 of a synchronizer sleeve indicated generally at 50.

The clutch member 38 is provided at circumferentially spaced points with radially extending flange portions 52 which project through suitable openings 53 in the sleeve 50, and which carry an annular yoke ring 54 composed of three washers or discs, the intermediate one being recessed at spaced points to provide recesses for wire spring members 55. The rings 54 are secured to the extending portions 52 of the clutch member 38 by means of rivets 56 and this entire construction, in general, is similar to that disclosed in United States Letters Patent No. 2,256,308, issued September 16, 1941 to Leo A. Bixby and Robert Lapsley which, in general, provides a blocking type synchronizer for selectively clutching either the gear 17 or the gear 44 to the shaft 35.

The shaft 35 as a reduced portion 57 projecting axially out of the rear end wall 26 of the auxiliary transmission housing and journaled in the ball bearing assembly 58 secured in position by the bearing cap 59, which bearing cap, in turn, carries a lubricant seal member 60, seating about the hub portion of the companion flange 62 secured in splined engagement on the projecting portion 57 of shaft 35 and held in position by the nut 63.

It will thus be seen that when the shift mechanism is actuated to move the clutch member 38 to the left, as viewed in Figure 1, the shaft 6 is directly coupled to the shaft 35 through the engagement of clutch teeth 39 and 42 from the gear 17. When the mechanism, however, is shifted to the right, as viewed in Figure 1, the gear 17 drives the gear 22 which, in turn, drives gear 44 through gear 27, and gear 44 is, in turn, clutched to the shaft 35 through engagement of clutch teeth 40 and 45.

Figure 2:
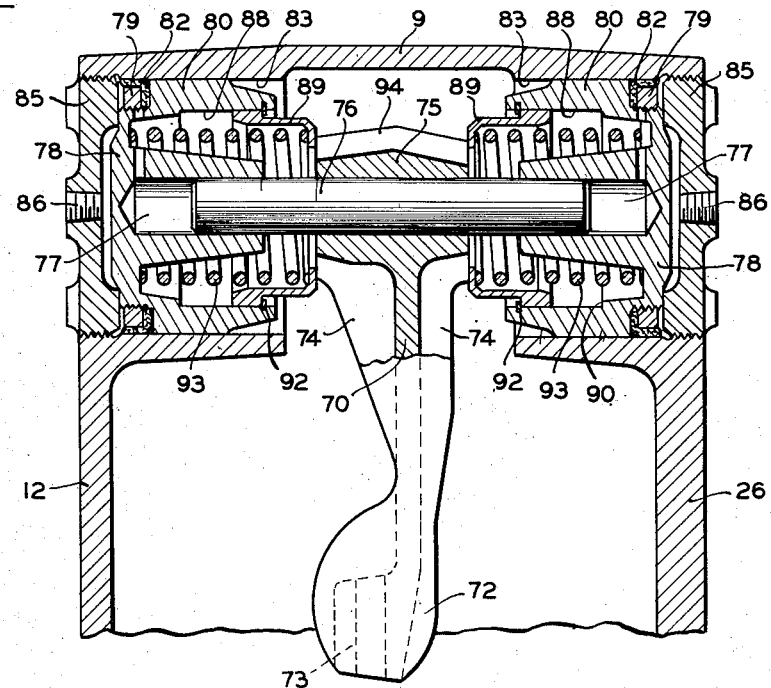
Figure 2 is a detail sectional view of the shift mechanism in neutral position.
Figure 3:
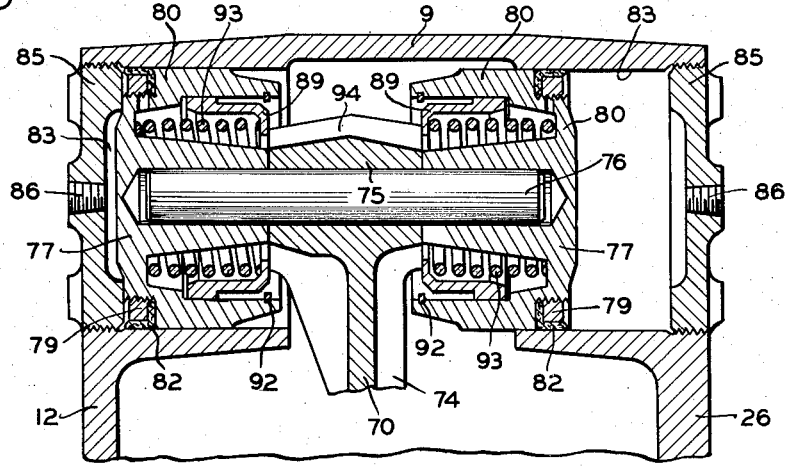
Figure 3 is a corresponding view of the shift mechanism in one of its shifted positions.

In order to control and select the position and movement of the clutch member 38, I have disclosed in Figures 2, 3, and 4, a clutch shifting mechanism, including a shifter fork, indicated generally at 70, having spaced arm portions 72 which, in turn, are provided with recesses 73 adapted to engage the opposite radial faces of the disc assembly 54. Preferably, the clutch fork is provided with strengthening ribs 74 for preventing deflection thereof, and is also provided with a hub portion 75 which may be secured to or slidably mounted on the shift rail 76. The shift rail 76 is supported at its opposite ends in suitable socket portions 77 formed in flange portion 78 onto which are threaded the rings 79.

The sockets 77, flange portions 78 and rings 79, form part of sliding piston members 80, within the cylinders 83 formed integrally with the housing 9 in an offset portion 84 thereof. The ends of these cylinders are preferably closed by threaded cap members 85 which are provided centrally with tapped pipe openings 86 for receiving conduits or pipes conducting fluid under pressure to the ends of these cylinders.

The pistons 80 are preferably hollow, and are provided with internal annular surfaces 88 within which are slidably mounted cup members 89, these cup members being prevented from movement in one direction within the pistons 80 by means of the shoulders 90 formed integral with the pistons and being held against outer movement in the opposite direction by means of snap rings 92 carried adjacent the open ends of the pistons. Within the axial space between the shoulders 90 and the rings 92, the cup members 89 have axial sliding movement and are normally held in neutral position against the rings 92 by relatively heavy coil springs 93 disposed about the socket portions 77 of the pistons and biased at one end against the base of the cup members 89 and at the opposite end against the flange portions 78 of the socket portions 77 which are integral with the pistons 80. The hub portion 75 of the shift fork 70 is provided with extended ear portions 94, as indicated in Figure 4, which bear against the flanged ends of the cap members 89. When fluid under pressure is introduced into either end of the shift control assembly, as for example through the port 86 in the right hand end of the cap member 85, this fluid acts against the piston 80 to move it to the left, as viewed in Figure 3. This provides for initial compression of the spring member 93 in the right hand cylinder 80, and when this spring member is compressed to a point where it exerts sufficient force on the shifter fork 70, the fork is moved to the left, thereby moving the clutch member 38 of Figure 1, together with the synchronizer sleeve 50, to the left.

The blocking action of the synchronizer sleeve will first bring the shaft 35 and the gear 17 into synchronism, at which time the pressure built up within the cylinder 83 at the right hand side of the structure shown in Figure 3, will force the clutch member 38 into position to engage clutch teeth 39, with corresponding compression of the left hand spring 93 within the left hand cylinder 80. When the pressure is released in the right hand cylinder 83, the spring action of the two springs 93 will force piston 80 back to the outer end of cylinder 83 and will return the shifter fork 70 back to its neutral position, thereby disengaging clutch teeth 39 and 42 to thereby return the auxiliary transmission to a neutral position.

A similar operation occurs when pressure is introduced into the left hand cap member 85 into the left hand cylinder 83 which moves the piston and its associated cup member 89 to the right, first moving the shifter fork 70 into position to produce blocking action in the synchronizer 50 and then building up sufficient pressure so that when synchronization is obtained, the shifter fork will move on to engage clutch teeth 40 with clutch teeth 45 of gear 44. Similarly, upon release of pressure in the left hand cylinder 83, the springs 93 will cooperate to return the shifter fork 70 to a neutral position.

Thus it will be apparent that with the shift control mechanism of the present invention, the synchronizer mechanism is adapted to operate for selectively providing either direct drive or a reduced speed drive through the auxiliary transmission, and upon release of the shifting pressure, will return the auxiliary transmission to a centering or neutral position without the use of detents or other mechanisms. Also, it is to be observed that with this construction the entire shifting mechanism is self-contained within the auxiliary transmission housing, and the only connections thereto are the fluid pressure connections to the end caps 85 of cylinders 80.

The auxiliary transmission housing 9 of Figure 4, as disclosed, is provided with an opening 96 in one side wall thereof, whereby the gears can be assembled into the housing 9 for mounting upon the various shafts therein. The opening 96 is adapted to be closed by any suitable cover plate.

It is therefore believed that I have provided a simple, compact auxiliary transmission and control which may be readily assembled to a conventional type transmission, and which embodies a self-contained actuating mechanism for the synchronizer by which the auxiliary transmission is clutched to the main output shaft of the conventional transmission.

I am aware that various changes may be made in certain details of the present construction, and I therefore do not intend to be limited except as defined by the scope and spirit of the appended claims.

I claim:

1. Control means for shifting a clutch member from a neutral position to one of two selected operating positions comprising, a shifter fork for the clutch member, a shift rail upon which said fork is mounted intermediate the ends thereof, piston means having axial bosses slidably receiving the ends of said rail, spring means carried by each piston means and engaging opposite end faces of said fork for normally positioning said fork in a neutral position, axially aligned cylinders having closed ends and open facing ends for receiving said piston means, said piston means normally lying adjacent the closed ends of said cylinders, and means for admitting fluid under pressure to one of said cylinders to move one of said piston means toward the other, thereby collapsing said spring means for each piston means and shifting said fork out of neutral position.

2. In combination, a housing having axially alined cylinders, a piston in each of said cylinders having axial apertured bosses, a shift rail supported in said bosses and having relative sliding movement therein, a shifter fork on said rail intermediate said pistons, means having sliding movement in said pistons and engaging opposite end faces of said fork, spring means about said bosses urging said sliding means into position to hold said fork normally in neutral position, and means for admitting fluid under pressure to one of said cylinders for moving the associated piston axially whereby said spring means are collapsed and rail and fork are shifted axially away from neutral position.

3. A control mechanism for shifting a clutch member from a neutral position to one of two selected operating positions comprising, a shifter fork, a pair of axially spaced pistons, a shift rail supported at its ends in said pistons and having limited movement relative thereto, said shifter fork being mounted on said rail intermediate said pistons, fixed cylinders for said pistons having closed ends and open facing ends, said pistons normally lying adjacent the closed ends of said cylinders, spring means in each piston engaging opposite end faces of said fork for positioning said fork into a neutral position intermediate said cylinders, and means for admitting fluid under pressure into the end of either cylinder to move the piston therein toward the other of said pistons against the spring means in each piston and thereby move said fork out of neutral position.

4. In a control mechanism of the character described, the combination of a pair of axially spaced cylinders, a pair of hollow cup-shaped pistons one for each of said cylinders and arranged in said cylinders with their open ends extending toward each other, cap members one in each of said pistons mounted for sliding movement axially in the latter, a shift rail projecting axially through said cap members and slidably supported at its opposite ends in said pistons, a shift fork mounted on said shift rail between said cap members, and spring means one for each of said pistons between the closed ends of the latter and the cap members at the open ends thereof for biasing said pistons toward the outer ends of said cylinders and said cap members outwardly of the open ends of said cylinders and into engagement with the opposite end faces of said shift fork.

5. In a control mechanism of the character described, the combination of a pair of axially spaced cylinders having end walls at the outer ends thereof, a pair of hollow cup-shaped pistons one for each of said cylinders and arranged in said cylinders with their open ends extending toward each other and with their closed ends extending toward the end walls of said cylinders, cup members one for each of said pistons extending inwardly of the open ends thereof and mounted therein for axial sliding movement, a shift rail projecting axially through said cap members and slidably supported at its opposite ends inwardly of said pistons, a shift fork mounted on said shift rail between said cap members, and spring means one for each of said pistons between the closed ends of the latter and said cap members for biasing said pistons to a position in which the closed ends of said pistons are disposed against said end walls of said cylinders, and for biasing said cap members outwardly of the open ends of said pistons into engagement with opposite end faces of said shift fork to position the latter in a neutral position intermediate said cylinders.

6. In a control mechanism of the character described, the combination of a pair of axially spaced cylinders having end walls at the outer ends thereof, a pair of hollow cup-shaped pistons one for each of said cylinders and arranged in said cylinders with their open ends extending toward each other and with their closed ends extending toward the end walls of said cylinders, cup members one for each of said pistons extending inwardly of the open ends thereof and mounted therein for axial sliding movement, a shift rail projecting axially through said cap members and slidably supported at its opposite ends inwardly of said pistons, a shift fork mounted on said shift rail between said cap members, spring means one for each of said pistons between the closed ends of the latter and said cap members for biasing said pistons to a position in which the closed ends of said pistons are disposed against said end walls of said cylinders, and for biasing said cap member outwardly of the open ends of said pistons into engagement with opposite end faces of said shift fork to position the latter in a neutral position intermediate said cylinders, and openings in said end walls of said cylinders for admitting fluid under pressure into the outer ends of either cylinder to move the piston therein toward the other of said pistons against the force of said spring means in each piston and thereby move said shift fork and said shift rail out of neutral position.

7. In a control mechanism of a character described, the combination of a pair of axially spaced cylinders having end walls at the outer ends thereof, a pair of hollow cup-shaped pistons one for each of said cylinders and arranged in said cylinders with their open ends extending toward each other and with their closed ends extending toward the end walls of said cylinders, said pistons each having an axially apertured central boss projecting toward the open end thereof, cup members one for each of said pistons extending inwardly of the open ends thereof and mounted therein for axial sliding movement, a shift rail projecting axially through said cap members and slidably supported at its opposite ends in the central bosses of said pistons, a shift fork mounted on said shift rail between said cap members, a coil spring extending axially of each of said pistons between the closed ends of the latter and said cap members for biasing said pistons to a position in which the closed ends of said pistons are disposed against said end walls of said cylinders, and for biasing said cap members in a direction outwardly of the open ends of said pistons into engagement with opposite end faces of said shift fork to position the latter in a neutral position intermediate said cylinders, and openings in said end walls of said cylinders for admitting fluid under pressure into the outer ends of either cylinder to move the piston therein toward the other of the pistons against the force of said spring means in each piston and thereby move said shift fork and said shift rail out of neutral position.

FRANCIS MARION HOGUE.

REFERENCES CITED

The following references are of record in the file of this patent:

UNITED STATES PATENTS

| Number | Name | Date |
|---|---|---|
| 1,010,054 | Irish | Nov. 28, 1911 |
| 1,515,841 | Dapron | Nov. 18, 1924 |
| 2,491,087 | Cardwell | Dec. 13, 1949 |